(12) United States Patent
McCormack et al.

(10) Patent No.: US 12,492,675 B2
(45) Date of Patent: Dec. 9, 2025

(54) BLADE PITCH CONTROL ARRANGEMENT

(71) Applicant: GKINETIC ENERGY LIMITED, County Limerick (IE)

(72) Inventors: Vincent McCormack, County Limerick (IE); Gary Brennan, County Limerick (IE)

(73) Assignee: GKINETIC ENERGY LIMITED, County Limerick (IE)

( * ) Notice: Subject to any disclaimer, the term of this patent is extended or adjusted under 35 U.S.C. 154(b) by 0 days.

(21) Appl. No.: 18/853,046

(22) PCT Filed: Mar. 31, 2023

(86) PCT No.: PCT/EP2023/058542
§ 371 (c)(1),
(2) Date: Sep. 30, 2024

(87) PCT Pub. No.: WO2023/187188
PCT Pub. Date: Oct. 5, 2023

(65) Prior Publication Data
US 2025/0250960 A1 Aug. 7, 2025

(30) Foreign Application Priority Data

Apr. 1, 2022 (GB) ..................................... 2204828

(51) Int. Cl.
*F03B 17/06* (2006.01)
(52) U.S. Cl.
CPC ........ *F03B 17/065* (2013.01); *F05B 2240/12* (2013.01); *F05B 2260/506* (2013.01); *F05B 2260/72* (2013.01)
(58) Field of Classification Search
CPC ...... F03B 17/065; F03B 17/067; F03D 3/066; F03D 3/067; F03D 3/068; F05B 2260/506; F05B 2260/72
See application file for complete search history.

(56) References Cited

U.S. PATENT DOCUMENTS 3,927,330 A 12/1975 Skorupinski
4,163,905 A 8/1979 Davison
(Continued)

FOREIGN PATENT DOCUMENTS

WO 2014154872 A1 10/2014
WO 2016066856 A1 5/2016

OTHER PUBLICATIONS

International Search Report and Written Opinion for Application No. PCT/EP2023/058542 dated Jun. 22, 2023 (9 pages).
(Continued)

*Primary Examiner* — Christopher R Legendre
(74) *Attorney, Agent, or Firm* — Michael Best & Friedrich LLP (57) ABSTRACT

A water turbine assembly for installation in a water flow defining a flow direction, the assembly comprising: an array of blades that is rotatable by the water flow about a turbine axis, transverse to the flow direction, to describe a blade path surrounding the turbine axis, each of the blades being pivotable about a respective pitch axis, the pitch axes being distributed with mutual angular spacing along the blade path; and a cam formation positioned to be engaged with the blades while the blades traverse a first portion of the blade path and to be disengaged from the blades while the blades traverse a second portion of the blade path. As each blade traverses the first portion of the blade path, pivoting of the blade about its pitch axis is controlled by engagement with the cam formation. As each blade traverses the second portion of the blade path, the blade is pivotable about its pitch axis within a range of movement delimited by a respective pair of stop formations, the stop formations of each pair being angularly spaced in mutual opposition about the pitch axis of the associated blade.

20 Claims, 6 Drawing Sheets

(56) References Cited

U.S. PATENT DOCUMENTS

| | | | |
|---|---|---|---|
| 7,385,302 B2 | 6/2008 | Jonsson | |
| 8,197,206 B2 | 6/2012 | Sundermann | |
| 8,994,204 B2 | 3/2015 | Pai | |
| 9,605,655 B2 | 3/2017 | Min | |
| 10,371,120 B2* | 8/2019 | McCormack | F03B 13/264 |
| 10,634,114 B1 | 4/2020 | Kovrlija | |
| 10,876,515 B2* | 12/2020 | McCormack | F03B 13/264 |
| 2015/0078897 A1 | 3/2015 | Min | |

OTHER PUBLICATIONS

United Kingdom Intellectual Propert Office Examination Report for Application No. 2204828.4 dated Nov. 14, 2024 (3 pages).
International Preliminary Report on Patentability for Application No. PCT/EP2023/058542 dated Sep. 24, 2024 (8 pages).

* cited by examiner

BLADE PITCH CONTROL ARRANGEMENT

FIELD OF THE INVENTION

The invention relates to arrangements for blade pitch control in water turbines, particularly vertical-axis water turbines used to generate power from water flows such as tidal streams.

BACKGROUND TO THE INVENTION

Vertical-axis water turbines typically employ a set of vertically-extending blades that are circumferentially spaced apart around a hollow interior of the turbine containing a turbine axis. The turbine is installed such that its turbine axis extends generally orthogonally to the fluid flow, and typically vertically. Water flowing around and between the blades generates lift that causes the blades to move and describe a common circular path around the turbine axis, thereby developing torque that can be used to produce electrical power.

In contrast with horizontal-axis turbines, as an individual blade of a vertical-axis turbine completes a full circuit around the turbine axis the blade at times moves with the fluid flow and therefore generally downstream, and at other times moves against the fluid flow and so generally upstream.

Typically, the blades have relatively short chord lengths and are few in number, creating a turbine of open construction that allows through-flow of water as a means of reducing drag and resistance to flow, or 'blockage'. Allowing flow through the turbine may also allow the blades to be configured to generate lift even when moving in an upstream direction, so that in principle energy can be extracted from fluid flowing through various regions of the turbine. It is not always beneficial to do so, however.

In the context of use with an incompressible fluid such as water, blockage is a significant factor in the efficiency of a water turbine. Blockage can be quantified by a 'blockage ratio', which represents the proportion of the fluid flow incident on the turbine that is blocked by the blades and hence diverted around the turbine. Such diverted fluid creates a bypass flow from which the turbine cannot extract energy, and so the greater the proportion of water that is carried into the bypass flow, the lower the efficiency of the turbine in terms of capturing the available energy. The bypass flow in turn produces a rotating boundary layer around the periphery of the turbine. The blockage ratio increases as the rotational speed of the turbine rises, causing the bypass flow to strengthen. The impact of blockage accumulates with turbine speed.

To minimise blockage, water turbines with three to five blades are typical in the industry. However, such water turbines rely on a high tip-speed ratio to compensate for the relatively low torque that is produced by the low number of blades. This imparts significant stresses to the blades and can lead to resonance due to the high speeds at which the turbines must operate, increasing the likelihood of failure. These problems compound as the turbine is scaled up, and in consequence such turbines are typically limited to outputs in the order of 25 kW.

Another factor that influences blockage is the pitch of the blades, namely the angle of the blade relative to the turbine axis, and the resulting angle of attack for each blade relative to the fluid flow. In this respect, in general terms minimising the blockage each blade presents entails minimising its angle of attack and therefore aligning the blade with the flow, such that a chord line extending between a leading edge and a trailing edge of the blade is parallel to the flow. Correspondingly, maximising the angle of attack by pivoting the blade to alter its pitch, or 'pitching' the blade, to extend transversely to the flow will typically maximise blockage. Relatedly, blades moving upstream inherently contribute more to blockage than blades moving downstream.

Meanwhile, the energy that a blade captures from the fluid flow is also determined by its angle of attack and its direction of movement, both of which vary in dependence on the angular position of the blade with respect to the turbine axis. In this respect, for generating lift an angle of attack of approximately 14° is optimal for most typical blade profiles, whereas the blade will enter a stall region if the angle of attack rises above 16°. More generally, lift is generated at 90° to the fluid flow, whereas drag is generated at 180° to the flow.

In some water turbines the blades have a fixed pitch, meaning that the angle of attack of each blade varies in a predetermined manner as the blade travels around the turbine axis. The fixed pitch that is selected is therefore a compromise between optimising energy capture, particularly in regions where the blades move downstream, and minimising blockage, particularly in regions where the blades move upstream. Selecting a fixed pitch that offers maximum power production, for example, will also tend to increase blockage and the stresses that the blades are subjected to, particularly as they move against the flow, and therefore increase the risk of failure.

Passive blade pitch arrangements are also known, in which each blade is able to pitch within a certain range as it moves around the turbine axis, the range of movement for each blade being delimited by a pair of blade stops that are angularly spaced around a pitch axis of the respective blade, for example. Each blade is held against one or the other of its associated blade stops by hydrodynamic forces in certain portions of the turbine cycle, at an angle of attack that produces lift. The range over which the blades can pitch is typically relatively narrow, to ensure that the angle of attack is suitable in regions in which lift is generated, while being sufficient to enable the blades to trail freely in the water flow in downstream regions of the turbine to reduce drag. Such passive systems can be relatively effective for low water flow rates, for example in the order of 1 m/s. However, as the water flow rate increases the efficiency of the turbine falls exponentially, largely due to the increased blockage that results from the resulting higher turbine speed.

In general, it is desirable to maximise the angle of attack for each blade at all times whilst avoiding stalling. This means that, ideally, the pitch of each blade should be actively controlled and varied individually as the blade cycles around its circular path around the turbine axis, to account for the continuously changing relationship between the blade and the fluid flow. In particular, it may be desirable to pitch blades moving downstream to a high angle of attack to maximise the lift generated. Meanwhile, blades moving upstream may be pitched to minimise drag and the stresses induced in the blade as it moves against the fluid flow. Optionally, blades moving upstream may also be pitched to generate some lift in the same circumferential direction as that generated by the blades moving downstream.

However, controlling the pitch of water turbine blades actively is challenging due to the high stresses that water turbine blades are subjected to. In this respect, the blades of a water turbine may experience forces that are orders of magnitude greater than for an equivalent wind turbine due to the greater density of water compared to air. For this reason, active pitch control arrangements for wind turbines do not translate directly to water turbines, as the linkages and other components used for controlling blade pitch in wind turbines are fundamentally incapable of withstanding the forces involved. Such arrangements may also not be suitable for use in aggressive environments such as in silt-laden seawater.

The Applicant's earlier application, WO 2016/066856, describes an active pitch control system for a vertical-axis water turbine in which the pitch of each blade is controlled and optimised actively at all times. However, the intricate mechanisms used to do so include several moving parts, and so the arrangement is challenging to implement at scale.

In related prior art, as another measure for enhancing performance water turbines may be used in combination with a bluff body that acts as an accelerator, which directs an accelerated fluid flow onto blades in an upstream portion of the turbine, whilst creating a shielding effect for blades moving upstream and thereby lowering drag and blockage.

Figure 1:
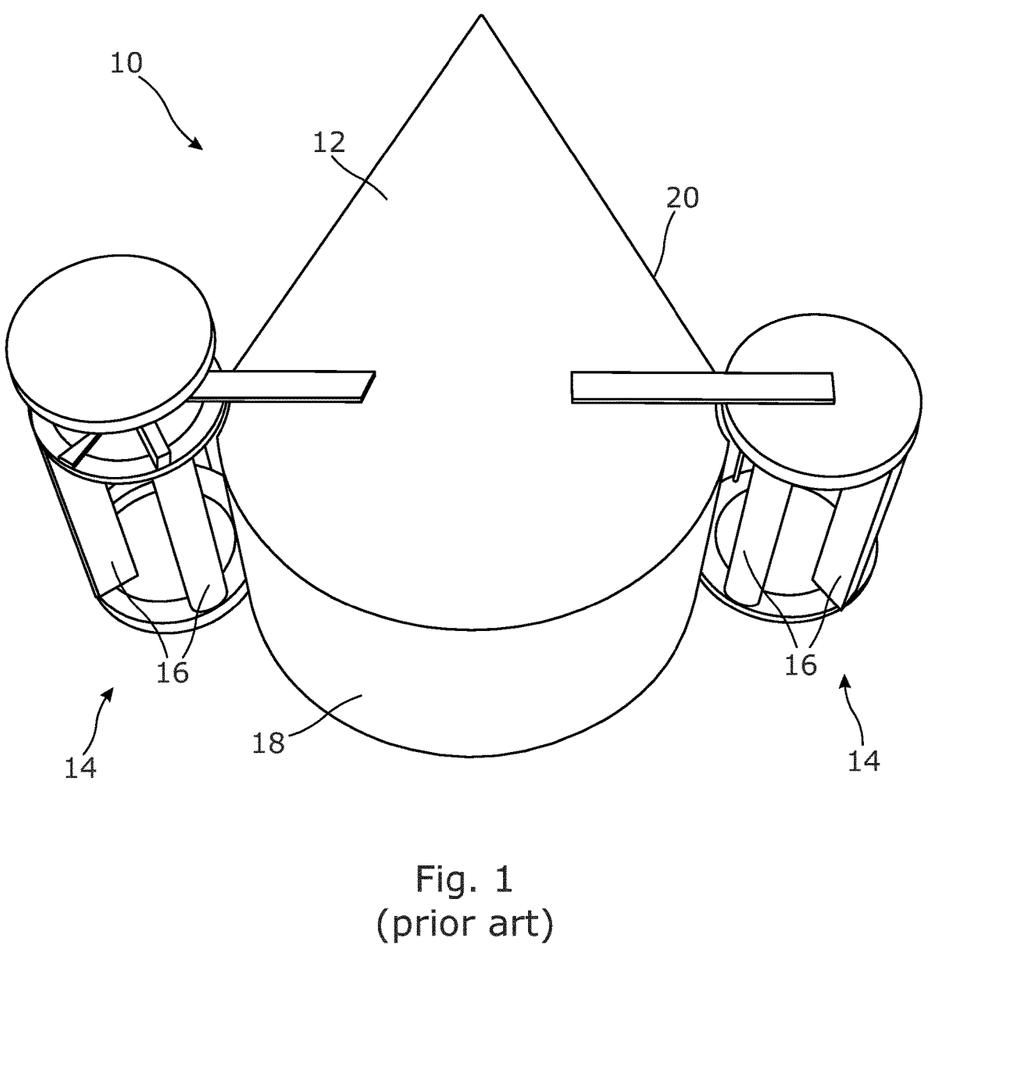

FIG. 1 shows an example of a water turbine assembly 10 including an accelerator 12, which was originally disclosed in the Applicant's earlier application, WO 2014/154872. In this example, the accelerator 12 is disposed between a pair of identical vertical-axis water turbines 14, each turbine 14 having a set of vertically-extending blades 16. The accelerator 12 has a curved front face defining a bow 18 that acts as a bluff body. Side faces 20 extend from the bow 18, and each turbine 14 is mounted to a respective one of the side faces 20. The side faces 20 converge rearwardly in this example, although in other examples accelerators may have parallel side faces. In use, the assembly 10 is installed in a tidal stream with the bow 18 facing into the flow and the turbines 14 spaced laterally across the flow. Fluid flowing towards the accelerator 12 is diverted to create accelerated driver currents that are directed at the turbines 14, effectively capturing a larger portion of the tidal stream than the individual turbines 14 could in isolation. Meanwhile, the blades 16 adjacent to the accelerator 12 are shielded by the redirected flow, and so can move upstream with reduced drag.

It is against this background that the present invention has been devised.

SUMMARY OF THE INVENTION

An aspect of the invention provides a water turbine assembly for installation in a water flow defining a flow direction. The assembly comprises: an array of blades that is rotatable by the water flow about a turbine axis, transverse to the flow direction, to describe a blade path surrounding the turbine axis, each of the blades being pivotable about a respective pitch axis, the pitch axes being distributed with mutual angular spacing along the blade path; and a cam formation positioned to be engaged with the blades while the blades traverse a first portion of the blade path and to be disengaged from the blades while the blades traverse a second portion of the blade path. As each blade traverses the first portion of the blade path, pivoting of the blade about its pitch axis is controlled by engagement with the cam formation. The first portion may therefore define an active portion of the blade path. As each blade traverses the second portion of the blade path, the blade is pivotable about its pitch axis within a range of movement delimited by a respective pair of stop formations. The stop formations of each pair are angularly spaced in mutual opposition about the pitch axis of the associated blade.

The stop formations of each pair may be movable with the associated blade about the turbine axis, to change in orientation relative to the flow direction as the blade travels along the blade path. The stop formations of each pair may be fixed relative to the pitch axis of the associated blade.

At least one of the stop formations of each pair may be positioned to be engaged with the associated blade as the blade traverses a third portion of the blade path, the third portion being within the second portion. The third portion may therefore define a passive portion of the blade path, in which the blade pitch is controlled by engagement with the stop formations. The third portion may directly follow the first portion, so that control of the pivoting of each blade is transferred from the cam formation to a respective stop formation as the blade disengages the cam formation and engages the stop formation. The assembly may be configured so that each blade engages each stop formation of the associated pair in succession within the third portion of the blade path.

The assembly may be configured so that each blade pivots freely in the water flow in a fourth portion of the blade path that is within the second portion. The fourth portion may therefore define a trailing portion in which the blades trail in the water flow, within the range of movement delimited by the associated stop formations. In such embodiments, as each blade traverses the fourth portion, the respective pair of stop formations may be oriented such that the range of movement that the stop formations allow for the associated blade comprises the flow direction.

It follows from the above that the assembly may be configured to provide: an active portion, in which the pitches of the blades are controlled actively by the cam formation; a passive portion, in which the pitches of the blades are controlled passively by the stop formations; and a trailing portion, in which the pitches of the blades are limited but are not controlled.

The stop formations of each pair may be angularly spaced from each other by at least 180°, for example.

The cam formation may be fixed relative to the turbine axis.

The cam formation may comprise a guide member or a guide slot, for example.

The cam formation may curve in a plane orthogonal to the turbine axis, in which case the curvature of the cam formation may vary around the turbine axis.

A radial distance between the cam formation and the blade path may vary around the turbine axis. In such embodiments, at least a portion of the cam formation may diverge from the blade path in a direction of rotation of the blades. Alternatively, or in addition, at least a portion of the cam formation may converge with the blade path in a direction of rotation of the blades. The cam formation may converge with the blade path and then diverge from the blade path in the direction of rotation of the blades.

The cam formation is optionally disposed radially inward of the blade path.

The assembly may be configured so that the blades are pivoted into engagement with the cam formation by the water flow in the first portion of the blade path. Similarly, the assembly may be configured so that the blades are pivoted into engagement with the stop formations by the water flow in the third portion of the blade path.

Each blade may comprise an engagement formation that is configured to engage the cam formation as the blade moves around the blade path. The engagement formation may also be configured to engage at least one of the stop formations associated with the blade. The engagement formation may extend along an axis that is parallel to, and mutually spaced from, the respective pitch axis. The engagement formation may extend directly from the blade, or may be supported by an arm extending from the blade. The engagement formation may be disposed at or close to a trailing edge of the respective blade. The engagement formation may comprise a follower that is arranged to slide or roll along the cam formation. It is also possible for the blade to engage the cam formation and/or one or both of the stop formations directly, instead of via an engagement formation.

The cam formation may be configured to vary the pitch of each blade in the first portion, so that the pitch of each blade is controlled actively and continuously as the blade moves through the first portion. This enables the angle of attack of the blade to be optimised as it moves through the first portion of the blade path.

The first portion may represent at least a quarter of the blade path. The second portion may represent at least half of the blade path.

The first portion may extend through an area in which the blades are configured to generate maximum lift from the water flow. Using the cam formation to control the pitch of the blades in this area may enable the lift generated by each blade to be optimised.

The first portion may be predominantly upstream of the turbine axis. The second portion may be predominantly downstream of the turbine axis.

The second portion, and optionally the fourth portion, may extend through an area in which the blades move upstream with respect to the water flow. Allowing the blades to trail as they move upstream may minimise drag without having to control the pitches of the blades in that region.

The blade path may be circular.

The turbine axis may be oriented generally vertically, when installed. Alternatively, the turbine axis may be oriented horizontally, or at any angle in a plane transverse to the water flow.

The respective pitch axes of the blades may extend parallel to the turbine axis.

The blades may be regularly spaced around the turbine axis.

The assembly may comprise an accelerator having a front face that is configured to generate an accelerated driver current from the water flow, in which case the array of blades is mounted beside the accelerator so that the accelerated driver current flows towards a portion of the blade path. The cam formation may extend predominantly inboard of the turbine axis with respect to the accelerator. A portion of the blade path may be shielded by the accelerator. The accelerator may comprise a flow directing vane that extends laterally from the accelerator upstream of the turbine axis, the flow directing vane being configured to direct the accelerated driver current onto blades in an upstream portion of the blade path, and to shield blades in a downstream portion of the blade path. A line extending in and projected from a plane of the flow directing vane may intersect the blade path as a chord that is inboard of the turbine axis with respect to the accelerator.

The array of blades may comprise at least six blades, for example, although the array may also have fewer than six blades.

Another aspect of the invention provides a method of controlling pitch of a blade of a water turbine assembly installed in a water flow defining a flow direction. The blade is part of an array of blades that is rotatable by the water flow about a turbine axis, transverse to the flow direction, to describe a blade path surrounding the turbine axis. Each of the blades is pivotable about a respective pitch axis, the pitch axes being distributed with mutual angular spacing along the blade path. The method comprises: engaging the blade with a cam formation to control pivoting of the blade about its pitch axis while the blade traverses a first portion of the blade path, and disengaging the blade from the cam formation while the blade traverses a second portion of the blade path; and limiting the range of movement for the blade in the second portion using a pair of stop formations that are angularly spaced in mutual opposition about the pitch axis of the blade.

The method may comprise rotating the stop formations with the blade about the turbine axis to change the orientation of the stop formations relative to the flow direction as the blade travels along the blade path.

The method may comprise engaging at least one of the stop formations with the blade as the blade traverses a third portion of the blade path, the third portion being within the second portion. The third portion may directly follow the first portion, so that the method comprises transferring control of the pivoting of the blade from the cam formation to one of the stop formations as the blade disengages the cam formation and engages the stop formation. The method may comprise engaging the blade with each stop formation in succession within the third portion of the blade path. For example, the blade may be caused to flip about its pitch axis to move between the stop formations.

The method may comprise allowing the blade to pivot freely in the water flow in a fourth portion of the blade path that is within the second portion.

The method may comprise controlling pitch of each blade of the array in a similar manner using a respective pair of stop formations for each blade. The stop formations may therefore be used to control the blade pitches passively in the third portion of the blade path.

Another aspect of the invention provides a water turbine assembly for installing in a water flow. The assembly comprises: a water turbine having a support structure and a set of blades supported by the support structure, the blades being supported for movement around a blade path that extends around a turbine axis, wherein each blade is supported for pivotal movement about a respective pitch axis relative to the support structure; and a blade guide arrangement that is configured to control the pitch of each blade about its pitch axis as the blade moves through a guided portion of the blade path, and to release the blade to allow the blade to pivot freely in the water flow in an unguided portion of the blade path.

The blade guide arrangement may be configured to vary the pitch of each blade in at least part of the guided portion. The blade guide arrangement may be configured to hold each blade at a constant pitch in at least part of the guided portion.

It will be appreciated that preferred and/or optional features of each aspect of the invention may be incorporated alone or in appropriate combination in the other aspects of the invention also.

BRIEF DESCRIPTION OF THE DRAWINGS

Reference has already been made to

FIG. 1, which shows a known water turbine assembly. In order that the invention may be more readily understood, preferred non-limiting embodiments thereof will now be described, by way of example only, with reference to the remaining drawings, in which like features are assigned like reference numerals, and in which:

DETAILED DESCRIPTION OF EMBODIMENTS OF THE INVENTION

In general terms, embodiments of the invention provide hybrid blade pitch control arrangements for vertical-axis water turbines, in which a blade guide arrangement controls the pitch of each blade of a water turbine actively for an active portion of its cycle around a turbine axis, whereas in other portions of the cycle the blade pitch is either controlled passively or is not controlled at all, such that the blade is allowed to pivot freely in a fluid flow, typically to align with the flow and therefore trail in the flow.

In some embodiments, the blade guide arrangement provides for an active portion in which the blade pitch is controlled actively, a passive portion in which the blade pitch is controlled passively, and a trailing portion in which the blade trails in the flow.

The blade guide arrangement may include a cam formation such as a guide rail, along which each blade travels so that engagement between the blade and the cam formation controls the pitch of the blade. The portion of the turbine cycle in which the blade engages the cam formation may therefore define the active portion.

The blade guide arrangement may include further guide features in the form of stop formations that control blade pitch in the passive portion, to the extent that the blades are pressed into engagement with the stop formations by hydrodynamic forces acting on the blades. So, the blade guide arrangement comprises a series of separate guide formations that each blade engages in succession while moving around the turbine axis.

Correspondingly, the stop formations may be positioned so that the range of movement that they allow for the associated blade encompasses the flow direction in the trailing portion of the cycle, such that the blade can pivot freely in the flow while traversing the trailing portion, within the limits created by the stop formations.

It is noted that a vertical-axis water turbine can, in principle, be laid on its side. The skilled reader will therefore appreciate that references to vertical-axis water turbines in this disclosure refer to water turbines that are configured with an axis of rotation that, in use, extends generally transversely and so orthogonally to a direction of a fluid flow from which energy is to be extracted.

Typically, the blade guide arrangement is configured to control blade pitch to optimise the angle of attack in regions where maximal lift can be generated to extract power from the fluid, particularly in upstream portions of the turbine in which the blades move with the flow. More specifically, in the example shown in FIG. 2 and described below, most power can be extracted in an upper left quadrant of the turbine, as viewed in FIG. 2, with power extraction also being possible in the upper right and lower right quadrants. Correspondingly, the blade guide arrangement releases the blades to pivot freely in regions where power extraction can be sacrificed, particularly in areas in which the blades move against the flow. In the example shown in FIG. 2, it is principally in the lower left quadrant of the turbine in which the blades may be allowed to trail. Allowing the blades to align with the flow naturally in these regions reduces drag and blockage at a minimal cost to power production, and so the net effect is to improve turbine efficiency.

Relinquishing control of the blade pitch in certain regions, and controlling blade pitch passively in other regions, enables the hybrid arrangement to be simplified relative to known active blade pitch control schemes that control blade pitch actively at all times. Accordingly, embodiments of the invention offer eased fabrication and improved reliability without a significant compromise in performance.

The blade pitch control implemented by the blade guide arrangement enables blockage to be managed with a higher number of blades than are conventionally used. For example, in embodiments of the invention turbines may include ten blades or more. This, in turn, allows the turbine to operate at lower speeds than similar turbines having fewer blades, thereby lowering the stresses induced in the individual blades and so improving reliability and enabling the power output of the turbine to increase.

Embodiments of the invention also make use of hydrodynamic forces acting on the blades due to the water flow to control the pitches of the blades. In this respect, the blade guide arrangement may be arranged to constrain pivoting of the blades in one direction only at certain angular positions, in the knowledge that the water flow will inherently turn the blades in that constrained direction. By recognising that constraining pivoting in both directions may be unnecessary, the blade guide arrangement can be further simplified.

Figure 2:
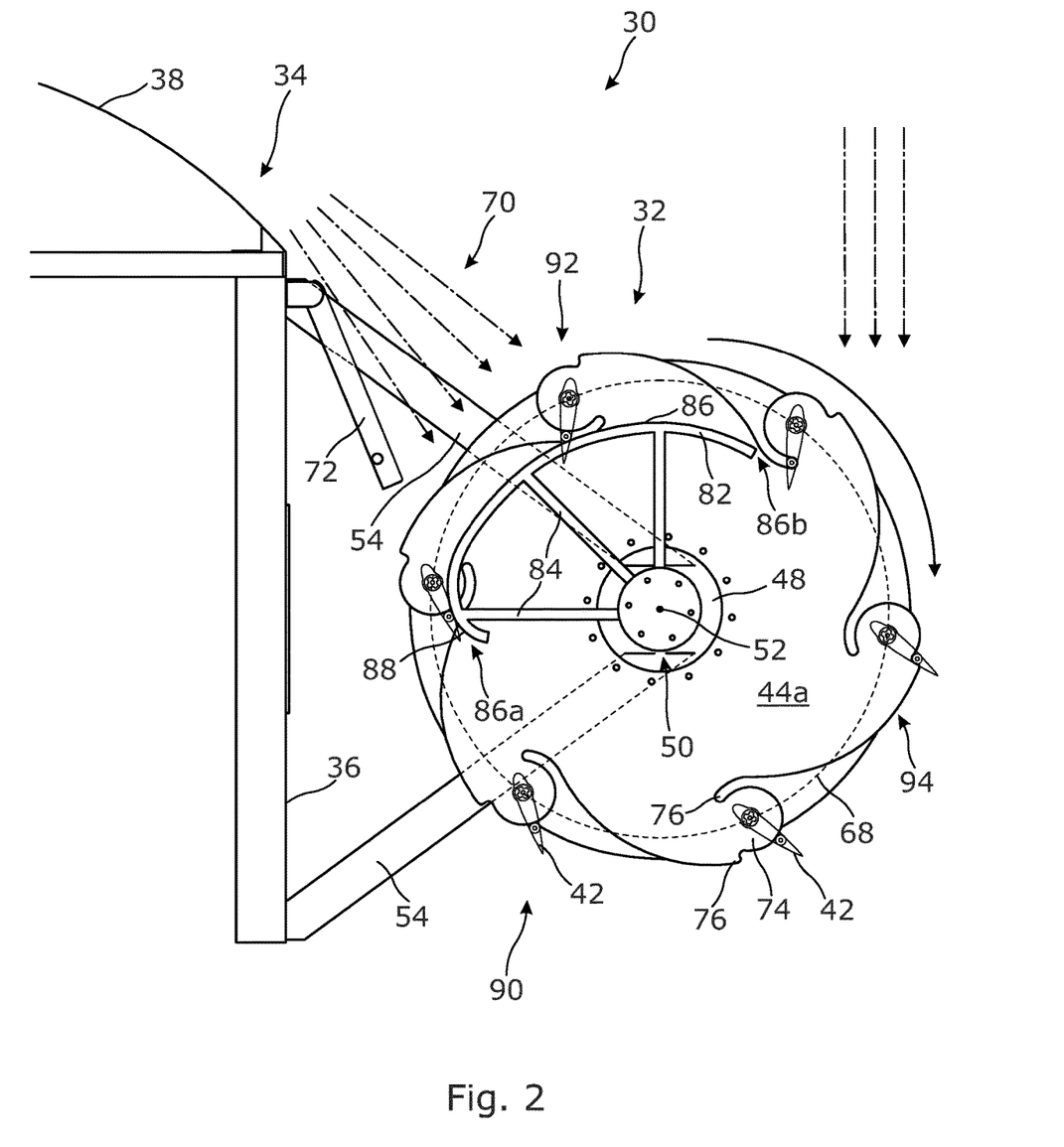
FIG. 2 shows a plan view of part of a water turbine assembly in accordance with the invention.

FIG. 2 shows a water turbine assembly 30 including a blade guide arrangement according to an embodiment of the invention. The water turbine assembly 30 is installed in a water flow such as a tidal stream, from which the water turbine assembly 30 extracts energy. As arrows in FIG. 2 indicate, the uninterrupted water flow has a flow direction that extends straight down from top to bottom in FIG. 2, defining a streamwise direction for the water turbine assembly 30.

The water turbine assembly 30 includes a water turbine 32 mounted to an accelerator 34. So, this example demonstrates how the blade guide arrangement can be configured to enhance performance in a context in which the fluid flow from which the turbine 32 extracts energy is manipulated by an accelerator 34. However, blade guide arrangements according to the invention may also be implemented in water turbine assemblies that do not include an accelerator 34.

In this example, the accelerator 34 has parallel planar side faces 36 extending rearwardly from a curved, convex front face defining a bow 38. The accelerator 34 therefore differs slightly from that of the example shown in FIG. 1 and described in more detail in WO 2014/154872, in which the side faces converge rearwardly. The accelerator of WO 2014/154872 could alternatively be used, however, and more generally blade guide arrangements according to the invention may be implemented in the water turbine assemblies disclosed in WO 2014/154872, and in a range of other water turbine assemblies.

It follows that, although not shown in FIG. 2, the water turbine assembly 30 may include a second water turbine mounted to the opposite side of the accelerator 34, such that the water turbine assembly 30 has a central longitudinal plane of symmetry.

Figure 6:
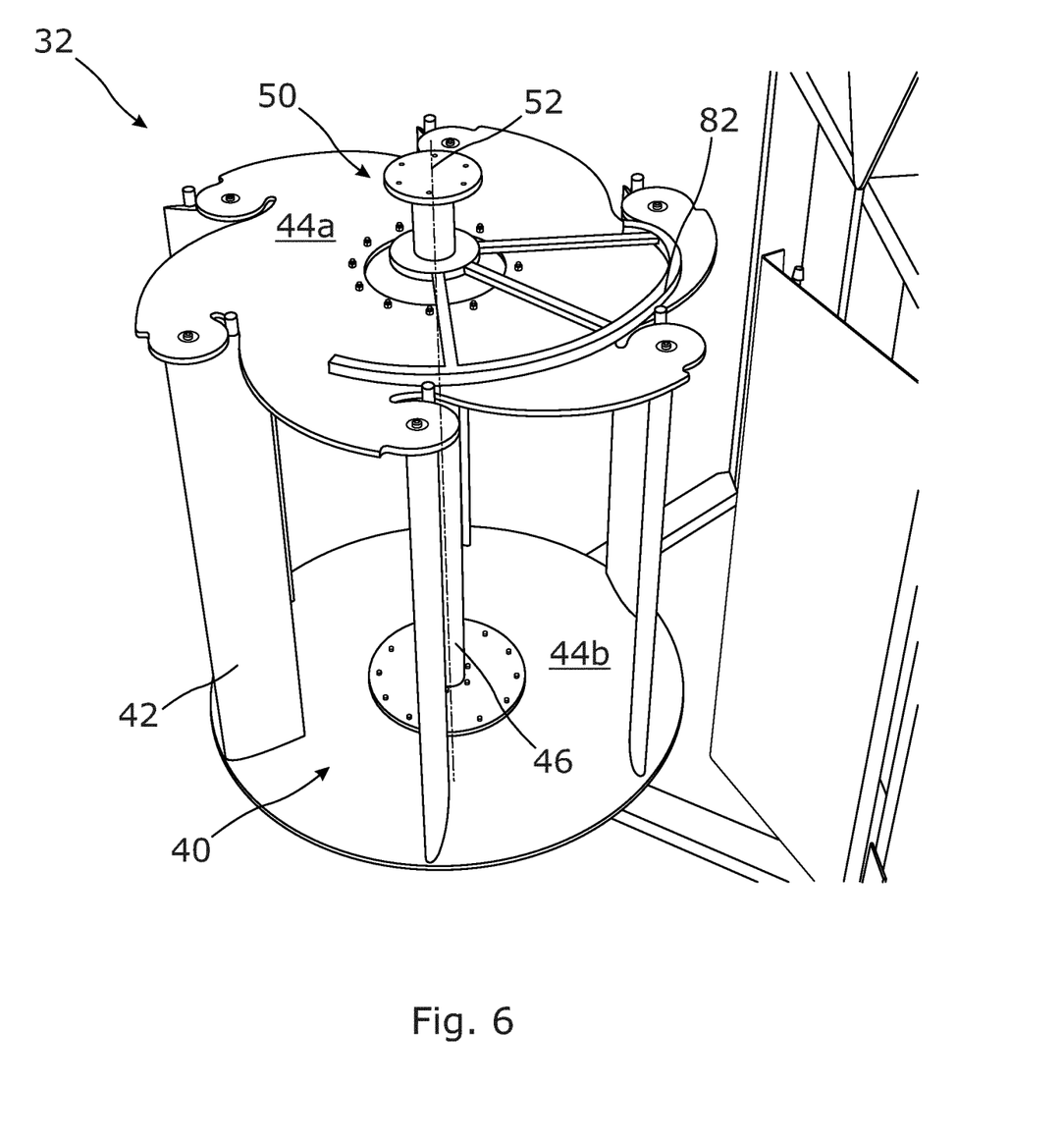
FIGS. 6 and 7 show a sequence of stages of rotation of the water turbine of FIG. 2.
Figure 7:
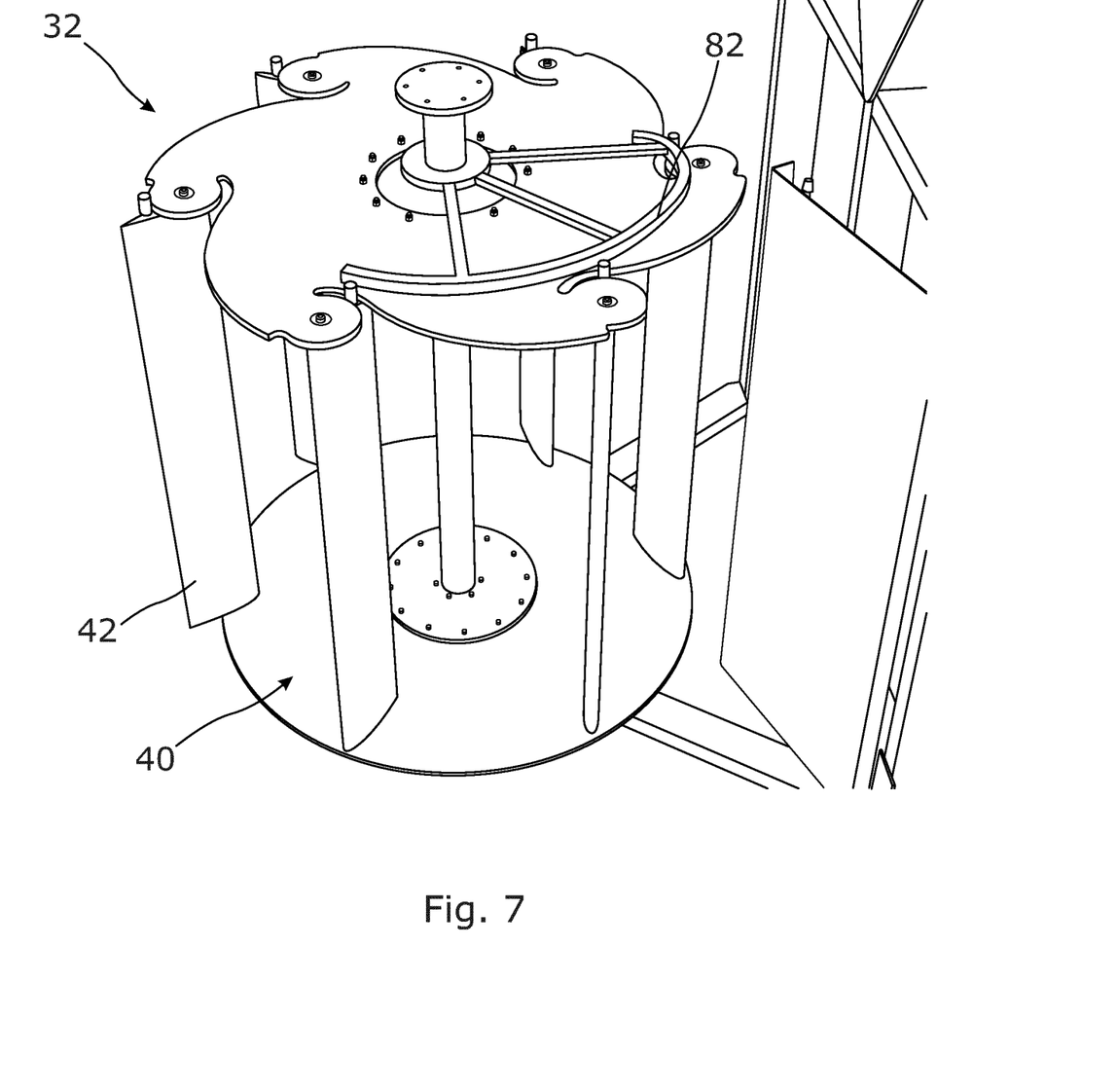

Referring now to FIGS. 2, 6 and 7 collectively, the water turbine 32 comprises a support structure 40 and a set of blades 42 supported by the support structure 40. In this example the water turbine 32 has six blades 42, although the number of blades may vary in other embodiments.

The support structure 40 includes a pair of disc-like support plates 44 defining an upper support plate 44a and a lower support plate 44b, and a turbine shaft 46 to which the support plates are fixed to extend in spaced, parallel planes. The upper and lower support plates 44a, 44b are each centrally mounted to the turbine shaft 46 via smaller discs defining hub plates 48, so that the turbine shaft 46 holds the support plates in coaxial relation. The support plates and the turbine shaft 46 are fixed together to form a rigid assembly that rotates as a unit. As is conventional, the support structure 40 is connected to a generator (not shown) that is configured to convert the rotary power developed by the turbine 32 into electrical power.

The lower support plate 44b has the general form of a disc with a circular peripheral edge. The upper support plate 44a is of similar diameter to the lower support plate 44b, but its peripheral edge is shaped to create features associated with the blade guide arrangement, as shall become clear from the description that follows.

The turbine shaft 46 protrudes axially above the upper support plate 44a to be received in an upper mount 50. Correspondingly, the turbine shaft 46 protrudes below the lower support plate 44b to engage a lower mount (not shown). The upper and lower mounts each define bushings that include bearings, so that the turbine shaft 46 is journaled between the upper and lower mounts. Accordingly, the upper and lower mounts accommodate rotation of the support structure 40 about a central longitudinal axis of the turbine shaft 46, which defines a turbine axis 52 of the water turbine 32. When the water turbine assembly 30 is installed in the water flow, the turbine axis 52 extends generally vertically.

The lower mount is supported by a pair of support struts 54 of equal length that extend laterally along converging paths from streamwise-spaced points on a side face 36 the accelerator 34, to merge with the lower mount. Each pair of support struts and the portion of the accelerator side face 36 connecting them therefore form an isosceles triangle in plan view. Correspondingly, although omitted from the figures for clarity, the upper mount 50 is supported by a further pair of support struts that is similar in configuration.

As best appreciated from FIG. 2, the support structure 40 supports the blades 42 in a circular array that is centred on the turbine axis 52, the blades 42 being identical to each other and evenly spaced around the turbine axis 52 close to the outer edges of the support plates. The array of blades 42 is therefore rotatable by the water flow around the turbine axis 52. Each blade 42 extends between the upper and lower support plates 44a, 44b so that a longitudinal axis of the blade 42 lies parallel to the turbine axis 52, and therefore extends generally vertically.

The blades 42 are circumferentially spaced apart from each other to surround a hollow interior of the turbine 32 that is empty aside from the turbine shaft 46. Accordingly, the water turbine 32 has an open construction that permits water to flow through the turbine 32, between the blades 42, and thereby reduces blockage as noted above.

Figure 3:
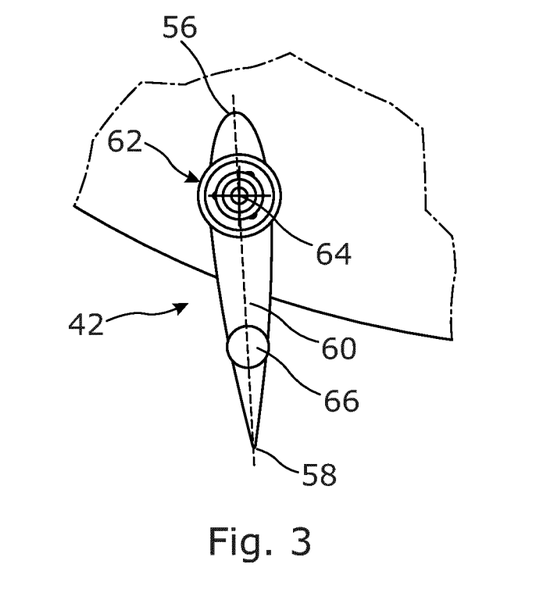
FIG. 3 shows an individual blade of the water turbine assembly of FIG. 2 with surrounding support features hidden.

FIG. 3 shows an individual blade 42 from above with the upper support plate 44a hidden. This reveals that the blade 42 has an aerofoil profile in transverse cross-section, for example a NACA profile. Accordingly, the blade 42 has a leading edge 56, which is shown at the top of the blade 42 in FIG. 3 and which faces into the flow in use, and a trailing edge 58 that is shown at the bottom in FIG. 3, the leading and trailing edges 56, 58 being connected by a chord line 60 of the blade 42. In this example, the cross-section of the blade 42 is uniform along its longitudinal length.

An elongate rod defining a blade shaft extends longitudinally through the blade 42 and projects axially from each end of the blade 42 to define upper and lower blade mounts. FIG. 3 shows an upper blade bushing 62 in the upper support plate 44a, in which the upper blade mount is pivotably mounted. Correspondingly, the lower blade mount is pivotably mounted in a lower blade bushing in the lower support plate 44b. The central longitudinal axis of the blade shaft therefore defines a pitch axis 64 about which the blade 42 can pitch relative to the turbine axis 52, the pitch axis 64 being at a fixed radial spacing from the turbine axis 52.

The pitch axis 64 extends close to the leading edge 56 of the respective blade 42. Accordingly, when the blade 42 is unrestrained and allowed to pitch freely, it naturally aligns with the flow so that its chord line 60 extends in a streamwise direction, with the leading edge 56 facing the flow, to minimise the drag generated around the blade 42.

The blade shaft (not visible in the drawings) is rigid and may be of steel for example. The remaining parts of the blade 42 are formed from composite material in this example, although other constructions may be used.

FIG. 3 also shows a spigot of circular cross-section that projects upwardly from the upper end of the blade 42 from a position close to the trailing edge 58, the spigot therefore extending parallel to, and being spaced chordwise from, the pitch axis 64 and the upper blade mount. The spigot defines a follower member 66 that is arranged to engage features of the blade guide arrangement to control the pitch of the blade 42 as the blade 42 travels around the turbine axis 52, as described in more detail later.

Returning to FIG. 2, as the curved arrow indicates the turbine 32 rotates in a clockwise direction in operation, in response to a flow of water between and around the blades 42. Accordingly, blades 42 that are outboard of the turbine axis 52 with respect to the accelerator 34 move in a generally downstream direction, whereas blades 42 inboard of the turbine axis 52 move in a generally upstream direction. It is noted that the turbine 32 shown in FIG. 2 moves in a clockwise direction as it is mounted on a starboard side of the accelerator 34. It is further noted that a turbine mounted on the port side of the accelerator 34 would be configured in the opposite way, to mirror the configuration of the starboard turbine of FIG. 2. So, a port-mounted turbine would rotate in an anticlockwise direction, for example, and all blade movements would be in an opposite sense to the turbine 32 of FIG. 2 as described below.

The blades 42, and more precisely the blade shafts and the respective pitch axes 64 of the blades 42, describe a common circular path as the turbine 32 rotates. This common circular path defines a blade path 68 around which each blade 42 travels as the turbine 32 revolves. The blades 42 pitch as they travel around the turbine axis 52, and so the leading and trailing edges 56, 58 do not follow a perfectly circular path.

FIG. 2 also indicates that an accelerated driver current 70 forms from water that is diverted around the bow 38 of the accelerator 34, this accelerated current 70 being inclined relative to the streamwise direction to extend across and disrupt the main, uninterrupted flow. The accelerated driver current 70 is directed onto blades 42 in an upstream portion of the water turbine 32 and so enables those blades 42 to develop additional lift, whilst shielding blades 42 downstream of the driver current and therefore reducing drag around the blades 42 as they move upstream in the portion of the turbine 32 inboard of the turbine axis 52.

The accelerator 34 includes a flow directing vane 72 that extends rearwardly and outwardly from the side face 36 of the accelerator 34, from a position at a front end of the side face 36 adjacent to the bow 38 and therefore upstream of the water turbine 32. The flow directing vane 72 extends along a path set at a shallow angle with respect to the side face 36, and terminates at a position that is spaced from the turbine axis 52 by a distance that approximately corresponds to the radius of the water turbine 32, at a position upstream of the turbine axis 52. The path of the flow directing vane 72 is such that a line extending in and projected from a plane of the vane 72 would intersect the blade path 68 to extend through the blade path 68 as a chord on the inboard side of the turbine axis 52 with respect to the accelerator 34. The flow directing vane 72 therefore acts as an extension to the bow 38 of the accelerator 34 by extending laterally across a transverse gap between the turbine 32 and the side face 36 of the accelerator 34, to block water flow between the turbine 32 and the accelerator 34 and to guide the accelerated driver current 70 onto the blades 42 in the upstream portion of the blade path 68. Accordingly, the flow directing vane 72 adds further guidance to the accelerated flow and enhances the shielding effect. It is noted that the size and angle of the flow directing vane 72 will vary for each application according to the flow regime.

As noted above, the upper support plate 44a is shaped to create features associated with the blade guide arrangement that control or constrain the pitch of the blades 42 at certain angular positions with respect to the turbine axis 52. In this respect, the upper support plate 44a is shaped to create a series of disc portions 74 around its periphery in a repeating pattern, so that the profile of the upper support plate 44a resembles the wheel of a circular saw. Each disc portion 74 is associated with a respective blade 42, and contains the upper blade mount for its blade 42. The disc portions 74 have ends that define a pair of blade stops 76 for their respective blades 42, the blade stops 76 of each pair being angularly spaced about the pitch axis 64 of the associated blade 42, in this example by approximately 240°, although it is noted that the angular spacing will vary for each application and may be greater or less than 240°. The blade stops 76 are engageable by the respective follower member 66 to limit pitching of the blade 42 to a corresponding angular range of approximately 240°.

Each pair of blade stops 76 is fixed relative to the pitch axis 64 and therefore rotatable with the associated blade 42 about the turbine axis 52, to change in orientation relative to the flow direction as the blade 42 travels along the blade path 68. Accordingly, the water flow brings the blade 42 into engagement with each of the blade stops 76 at certain angular positions, whereas at other points on the blade path 68 the flow direction falls within the range of movement delimited by the blade stops 76 and so the blade 42 may pivot relatively freely within that range to align naturally with the water flow.

Figure 4:
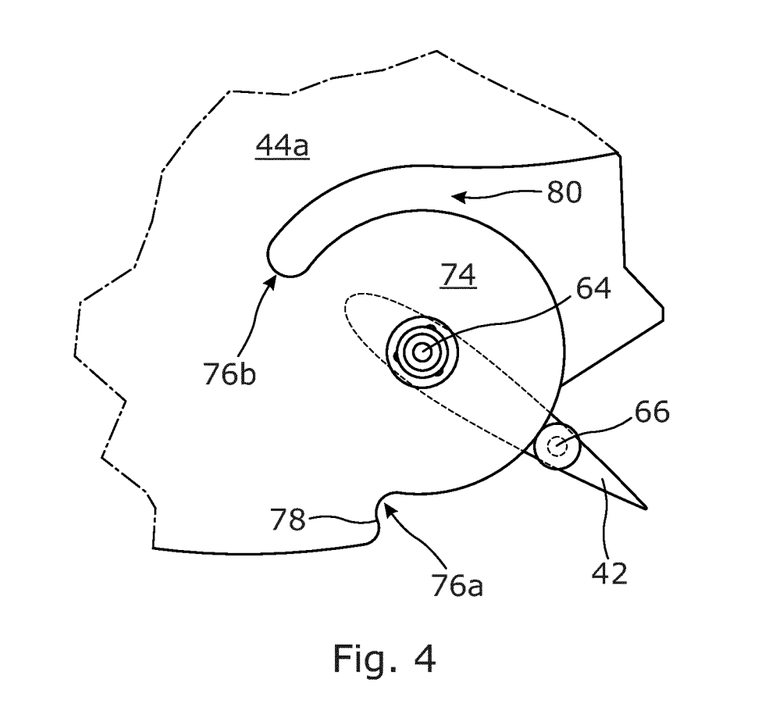
FIG. 4 corresponds to FIG. 3 but shows the support features.

FIG. 4 corresponds to FIG. 3 and shows the portion of the upper support plate 44a that is hidden in FIG. 3, namely a disc portion 74 associated with the blade 42. This reveals that the disc portion 74 begins with a notch 78 that extends radially inwardly from the outer edge of the upper support plate 44a, from a position a few degrees ahead of the pitch axis 64 of the blade 42 with respect to the direction of rotation. From a radially inner end of the notch 78, the edge of the upper support plate 44a follows a circular profile around approximately 240°, to form the disc portion 74. The disc portion 74 therefore has a centre of curvature coinciding with the pitch axis 64 of the associated blade 42, and a radius corresponding to the radial spacing between the pitch axis 64 and the follower member 66 of the blade 42.

A curved slot 80 is formed on a radially inner side of the disc portion 74 that separates the disc portion 74 from the rest of the upper support plate 44a, the slot 80 being sized to receive the follower member 66 of the blade 42. The slot 80 opens at its radially outer end with respect to the turbine axis 52. An outer edge of the disc portion 74 defining an inboard side of the slot 80 with respect to the pitch axis 64 is part-circular. An outboard side of the slot 80 is initially parallel to the inboard side of the slot 80, hence with concentric part-circular curvature around about 90° of arc from the inner end of the slot 80, before diverging from the inboard side of the slot 80 to curve toward the notch 78 of the neighbouring disc portion 74, curving gently through a concave-to-convex inflection as it extends to that notch 78, radially outboard of and angularly spaced from the inner end of the slot 80.

The blade 42 shown in FIG. 4 can therefore pitch between a position in which the follower member 66 engages the notch 78, and a position in which the follower member 66 engages the inner end of the slot 80. The notch 78 therefore defines a first stop formation representing an outer blade stop 76a, and the inner end of the slot 80 defines a second stop formation representing an inner blade stop 76b. Between them, the inner and outer blade stops 76 allow the blade 42 to pitch over a range of approximately 240° as noted above. Notably, this range allows the blade 42 to flip as it transitions out of the accelerated driver current 70, as explained in more detail below.

Returning once more to FIG. 2, the blade guide arrangement further includes a blade guide rail 82 that is positioned vertically above and therefore longitudinally outboard of the upper support plate 44a with respect to the turbine axis 52, at a longitudinal position at which the follower members 66 of the blades 42 engage the blade guide rail 82 as the blades 42 travel around the blade path 68.

The blade guide rail 82 is supported by three radial spokes 84 that extend from the upper mount 50 in this example, so that the position of the blade guide rail 82 is fixed relative to the turbine axis 52 and to the accelerator 34. It should be appreciated that the blade guide rail 82 may be mounted in various other ways so that it is fixed relative to the turbine axis 52.

The blade guide rail 82 is set radially inward of the blade path 68 and has an outer radius and a curvature with respect to the turbine axis 52 that vary circumferentially, so that the blade guide rail 82 and the blade path 68 converge initially and then diverge gradually in the direction of rotation of the turbine 32, namely clockwise in FIG. 2.

A radially outer wall of the blade guide rail 82 defines a guide surface in the form of a cam track 86 that the follower members 66 of the blades 42 engage and slide along. The cam track 86 has a receiving end 86a, which lies directly between the turbine axis 52 and the side face 36 of the accelerator 34 in streamwise alignment with the turbine axis 52 in this example, and a release end 86b that lies upstream of, and slightly outboard of, the turbine axis 52. The cam track 86 therefore extends around a little more than 90° around the turbine axis 52, and therefore slightly over a quarter of the blade path 68. The position, curvature and extent of the cam track 86 is determined in accordance with the accelerated driver current 70 that is created by the accelerator 34 as well as with the characteristics of the water flow and the blade profile to achieve performance objectives, and so vary according to the requirements of each application.

The blade guide rail 82 curves relatively sharply inwardly at the receiving end so that the cam track 86 converges with the blade path 68, to create a curved lip 88 that extends radially inwardly to an extent that is equal to or greater than the distance between the pitch axis 64 and the follower member 66 of a blade 42, and therefore ensures that follower members 66 cannot become ensnared in the receiving end of the guide rail 82 but are brought into contact with the guide rail 82 when entering the active pitching portion. Immediately after this, the cam track 86 has a maximum radius with respect to the turbine axis 52, and so is at its closest to the blade path 68. The cam track 86 then curves to diverge gently from the blade path 68, until reaching a short final portion leading up to the release end in which the cam track 86 has a substantially constant radial spacing from the blade path 68.

As each blade 42 moves around the blade path 68, its follower member 66 comes into engagement with the blade guide rail 82 at the receiving end of the cam track 86. With continued movement of the blade 42 around the blade path 68, the follower member 66 slides along the cam track 86, being held against the cam track 86 by hydrodynamic forces acting on the blade 42. The pitch of the blade 42 is determined by the angular position of the follower member 66 relative to the pitch axis 64. As the radial spacing between the cam track 86 and the blade path 68 gradually increases due to the curvature of the blade guide rail 82, the follower member 66 moves gradually inward radially and, correspondingly, the pitch of the blade 42 gradually changes in a predetermined manner. This is visible through a comparison of the blades 42 shown in FIG. 2, in that the blade 42 shown close to the receiving end of the cam track 86 is at a pitch such that the chord line is closer to alignment with the blade path 68 than the chord line of a blade 42 further along the cam track 86.

Hence, the blade guide rail 82 varies the pitch of each blade 42 passing along it in a controlled, predetermined manner. The blade guide rail 82 therefore forms a cam arrangement with the follower members 66 of the blades 42, which therefore act as cam followers. The follower members 66 may include rollers to ease sliding along the cam track 86 as the blade 42 moves along the blade path 68.

Figure 5:
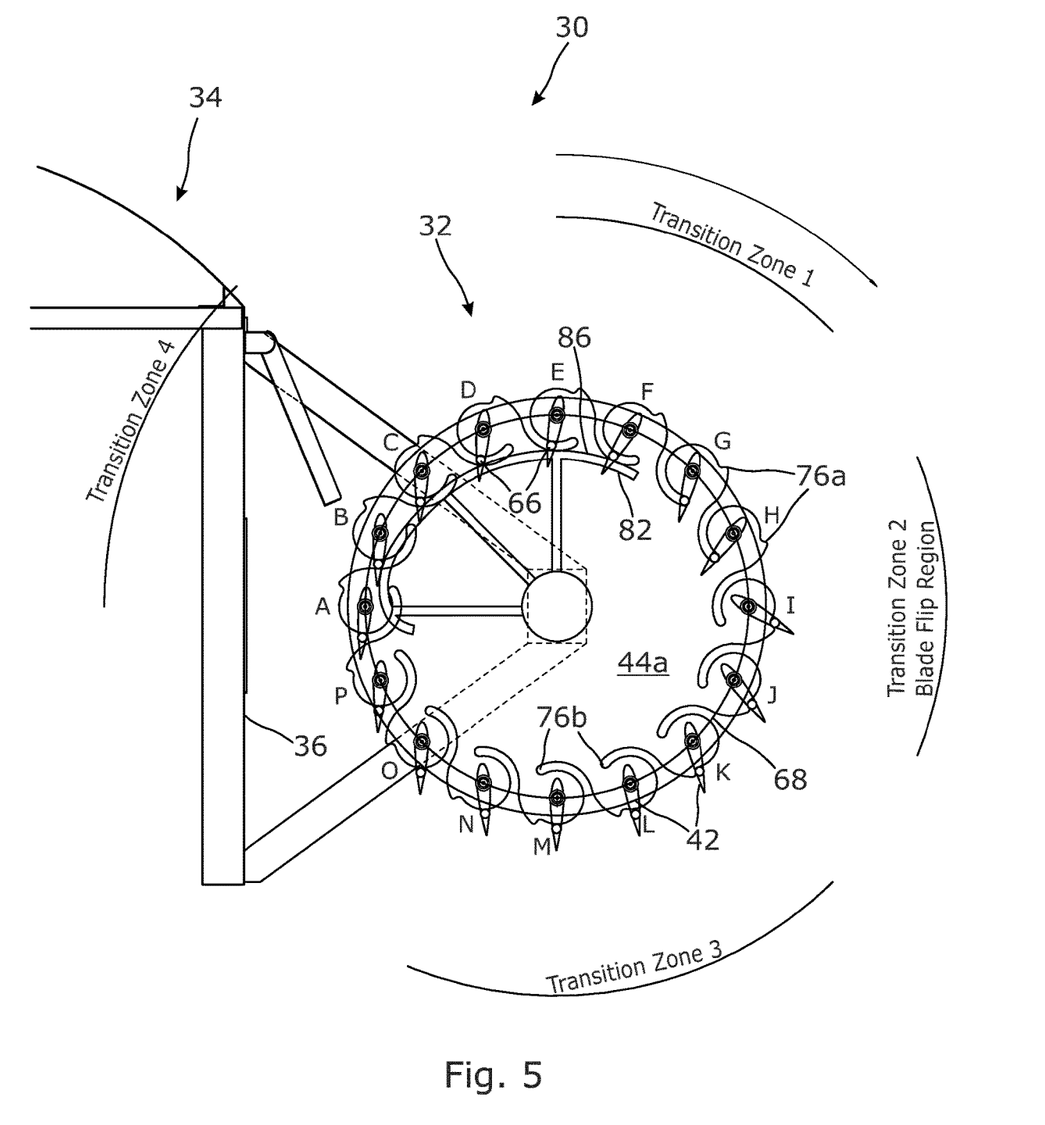
FIG. 5 represents the pitch of a blade of the water turbine assembly of FIG. 2 at various angular positions.

FIG. 5 shows a series of positions, labelled 'A' to 'P', that an individual blade 42 occupies as it traverses the blade path 68, and so further illustrates pitching of the blade 42 while it is engaged with, and moves along, the cam track 86. This also makes clear how the follower member 66 is pressed into engagement with the cam track 86 by hydrodynamic forces acting on the blade 42, causing the blade 42 to pivot gradually anticlockwise about its pitch axis 64 as the blade 42 moves around this portion of the blade path 68. In this respect, the blade guide arrangement makes use of these hydrodynamic forces to control the blade pitch, in that pivoting of the blades 42 is constrained only in the direction in which the water flow will cause them to pivot. For example, in the region in which the follower members 66 engage the cam track 86, only anticlockwise pivoting is constrained by the blade guide arrangement, and specifically by the blade guide rail 82. This enables the blade guide arrangement to be simplified.

In this respect, FIG. 5 shows the blade 42 in a position 'A' that is in streamwise alignment with the turbine axis 52 adjacent to the receiving end of the cam track 86, at which point the follower member 66 is not engaged with the cam track 86. In this position, the blade 42 is moving upstream and is in a region in which it is shielded from the accelerated driver current 70 produced by the accelerator 34, and in which there is some turbulence in the water flow. Accordingly, the water flow does not create hydrodynamic forces that act on the blade 42 to turn the blade 42 so that its follower member 66 engages the cam track 86. Instead, the blade 42 is able to pitch freely to trail in the water flow at this point, within the constraints imposed by the blade stops 76, thereby minimising drag.

However, when the blade 42 reaches the next clockwise position, labelled 'B' in FIG. 5, its follower member 66 is engaged with the cam track 86. This is because the blade 42 has now passed the plane of the flow directing vane 72 and is therefore exposed to the accelerated driver current 70. Thus, the accelerated driver current 70 turns the blade 42 so that its follower member 66 bears against the cam track 86. Correspondingly, the cam track 86 is configured so that the resulting pitch of the blade 42 in this position creates an optimised angle of attack that maximises the lift that the blade 42 generates from the accelerated driver current 70 and directs that lift circumferentially to maximise the torque that is transferred to the turbine shaft 46. The cam track 86 then alters the pitch of the blade 42 as it moves through the subsequent positions 'C' to 'F' shown in FIG. 5 to maintain an optimised angle of attack for each angular position, to account for the changing flow conditions and the position of the blade 42 relative to the flow.

As the blade 42 approaches the release end of the cam track 86 in a region labelled 'Transition Zone 1' in FIG. 5, at position 'F', the follower member 66 is almost engaged with its associated inner blade stop 76b and is therefore close to the allowable limit of its pitch. In this region, the spacing between the cam track and the blade path 68 widens gradually to reach a point at which the cam track 86 no longer prevents anticlockwise rotation of the blades 42 in response to hydrodynamic forces acting on the blade 42, at which point the blade 42 continues to turn until its follower member 66 engages the inner blade stop 76b. In this way, control of the pitch of the blade 42 is transferred from the blade guide rail 82 to the inner blade stop 76b as the follower member 66 disengages the cam track 86.

For the next two positions shown in FIG. 5, labelled 'G' and 'H', the follower member 66 remains engaged with the inner blade stop 76b and so has a constant pitch. This pitch is calculated to maintain an effective angle of attack to continue generating lift in the final parts of the accelerated driver current 70, noting that the potential for power generation in this region is slightly lower than for regions where the cam track 86 controls the blade pitch, and so there is less of a need to control the blade pitch precisely in this region and a constant pitch is acceptable over a short portion of the blade path 68.

As the blade 42 continues around the blade path 68 while engaged with the inner blade stop 76b, the angle of attack increases. This causes the point of lift to move towards the leading edge 56 due to the aerofoil profile of the blade 42. The lift force holding the blade 42 against the inner blade stop 76b also reduces, as the respective directions and magnitudes of rotation and flow come into balance with each other. Simultaneously, the movement of the blade 42 along the blade path 68 generates forces that act on the blade 42 to create a turning moment around the pitch axis 64 that acts to turn the blade 42 clockwise. Once the turning moment overcomes the effect of the lift force, at a point corresponding to 'Transition Zone 2' in FIG. 5, the resulting hydrodynamic forces cause the blade 42 to flip by pivoting through its full pitch range, so that FIG. 5 shows the follower member 66 engaged with the outer blade stop 76*a* in position 'I'. The blade flip is illustrated further in FIGS. 6 and 7, in that FIG. 6 shows a perspective view of a blade 42 about to flip, the blade 42 being shown to the left in FIG. 7, and then FIG. 7 shows that blade 42 immediately after performing its flip so that its trailing edge 58 points outwards.

Returning to FIG. 5, the outer blade stop 76*a* then maintains the blade 42 at a constant pitch through the next two angular positions, labelled 'J' and 'K'. The outer blade stop 76*a* is therefore configured to provide the required angle of attack for generating lift in these positions.

Power extraction therefore continues as the blade 42 then enters a region labelled 'Transition Zone 3' in FIG. 5. Flow conditions in Transition Zone 3 become more turbulent as the blade 42 progresses, until power extraction from the incident flow becomes less viable, particularly in the lower left quadrant of the turbine 32 as viewed in FIG. 2. So, the focus switches to minimising drag and blockage. In this respect, as the blade 42 travels around the turbine axis 52, the disc portion 74 supporting the blade 42 changes orientation relative to the flow direction and the accelerator 34, until a position is reached at which the outer blade stop 76*a* is closer to the side face 36 of the accelerator 34 than the pitch axis 64. The blade 42 naturally aligns with the fluid flow and so, at this point, this tendency to align acts to turn the blade 42 so that its follower member 66 lifts from the outer blade stop 76*a*. The blade 42 then pivots freely, albeit within the limits of the inner and outer blade stops 76, to remain aligned with the flow and therefore trail in the flow until it reaches the cam track 86 and is subject to the accelerated driver current 70 once again, corresponding to 'Transition Zone 4' in FIG. 5.

The points at which the follower disengages the outer blade stop 76*a* and then reengages the cam track 86 will vary according to the characteristics of the flow, which in turn will vary from site to site and over time. Correspondingly, the geometry of the cam track 86 and the inner and outer blade stops 76 can be tailored to suit the requirements of each application and the expected operating conditions in the water flow in which the water turbine assembly 30 is to be installed. In this example, the blade 42 disengages the outer blade stop 76*a* at position 'L', and then trails until it re-engages the cam track 86 at position 'B'.

It follows from the above that the guide surface of the blade guide rail 82 defining a cam formation and the stop formations defined by the inner and outer blade stops 76 create a series of formations that the follower member 66 of each blade 42 engages at different times to control the pitch of the blade 42 over a guided portion of the blade path 68. Accordingly, the blade guide rail 82 and the inner and outer blade stops 76 collectively define the blade guide arrangement, with the blade guide rail 82 and the inner and outer blade stops 76 acting to control the pitch of a blade 42 at different stages of the guided portion of the blade path 68.

It also follows that the portion of the blade path 68 over which the blade guide arrangement guides the pitch of the blade 42 defines a guided portion of the blade path 68. Although the blades 42 perform a flip within the guided portion, that flip is controlled to the extent that it occurs at a particular expected angular position, and so the flip may be considered to form part of the guided movement of the blade 42.

Correspondingly, the portion of the blade path 68 in which the follower members 66 of the blades 42 do not engage with any of the features of the blade guide arrangement, such that the blade 42 is allowed to pivot freely to trail in the fluid flow, defines a trailing or unguided portion 90 of the blade path 68. Accordingly, in the trailing portion 90 blade pitch is limited, but not controlled.

In the guided portion of the blade path 68, the blade guide arrangement acts to control the pitch of the blade 42 to optimise its angle of attack for power generation. In the trailing portion 90 of the blade path 68, the blade guide arrangement releases the blade 42 to allow the blade 42 to pivot freely, which naturally minimises drag in regions where there is little potential for power extraction, especially as the blades 42 move upstream before reengaging the cam track 86. Allowing the blades 42 to pivot freely also ensures that they do not generate lift in a direction opposed to the direction in which the turbine 32 rotates, so that all lift generated by the blades 42 of the turbine 32 acts in substantially the same rotational direction.

Whereas earlier blade pitch control arrangements have sought to control the blade pitch even in regions in which the primary objective is to minimise drag, embodiments of the invention are predicated on the insight that allowing the blades 42 to trail in the flow in those regions, while still controlling pitch actively or passively in power-generating regions, achieves similar performance with a simplified pitch control arrangement.

The guided portion extends from the point at which the follower member 66 first engages the cam track 86 to the point at which it disengages the outer blade stop. The guided portion comprises two sub-portions: an active portion 92, in which the blade 42 engages the cam track 86; and a passive portion 94, in which the blade 42 engages one of its associated blade stops 76. Accordingly, in the active portion 92 the blade pitch is controlled actively to optimise the angle of attack continuously, whereas in the passive portion 94 the blade pitch is held at one of two constant pitches, with a controlled flip to transition between the two blade stop positions.

In this example, the active, passive and trailing portions each represent approximately one third of the blade path 68. These proportions may vary according to the requirements of each application, however.

More generally, the blade path 68 may also be regarded as being divided into a first portion corresponding to the active portion 92, and a second portion in which the blade 42 is disengaged from the blade guide rail 82 and its movement is limited by the blade stops 76. It follows that the second portion comprises the passive portion 94 and the trailing portion 90, which may be regarded as third and fourth portions respectively under this alternative nomenclature. The first and third portions therefore collectively correspond to the guided portion defined above.

It will be appreciated by a person skilled in the art that the invention could be modified to take many alternative forms to that described herein, without departing from the scope of the appended claims.

In particular, the blade guide arrangement described above could take a variety of forms. For example, the inner and outer blade stops could be defined in various other ways, for example using stubs or other formations attached to the upper support plate, which plate may therefore be simplified and so have a circular edge. In such cases, the blade stops may be defined by opposing sides of a single formation, or by separate formations. The slots of the upper support plate described above are therefore optional and, if they are used, may have a different shape to that shown while creating abutments to define the blade stops.

It is also possible to incorporate a second cam formation, for example a second cam track, that controls blade pitch to create a second active portion of the blade path in a downstream portion of the turbine. For example, the second cam formation may control blade pitch in the region of the above described embodiment in which the blades are allowed to trail, such that the second active portion replaces the trailing portion. Alternatively, the blades may still be allowed to trail in part of the blade path, such that there is both a second active portion and a trailing portion.

The blade stops could be supported by, or integrated with, the lower support plate instead of the upper support plate. It is also possible for the blade stops to be supported by the turbine shaft or by a separate support element. In general terms, the water turbine assembly can be inverted so that the components associated with the blade guide arrangement are located on or near the lower support plate.

Similarly, the blade guide rail could be replaced by a plate having a guide slot with a similar profile, in which case a side wall of the slot could act as the cam track. The cam track could be positioned at a different longitudinal position, for example beneath the lower support plate.

The blade guide rail could be extended to cover a larger share of the active portion of the blade path, and may potentially engage the follower members of the blades until the blade flips, such that the inner blade stop is not used for controlling blade pitch at any stage.

Although the above embodiment is described in the context of a vertical axis turbine, it is envisaged that in other embodiments the turbine may be oriented with its axis horizontal, or at any angle in a plane transverse to the flow.

It is also possible for the trailing edges of the blades to engage features of the blade guide arrangement directly, such that the follower members can be omitted. In further alternatives, follower members may be configured differently, for example being supported by an arm extending outboard of the associated blade.

What is claimed is:

1. A water turbine assembly for installation in a water flow defining a flow direction, the assembly comprising:
    an array of blades that is rotatable by the water flow about a turbine axis, transverse to the flow direction, to describe a blade path surrounding the turbine axis, each of the blades being pivotable about a respective pitch axis, the pitch axes being distributed with mutual angular spacing along the blade path; and
    a cam formation positioned to be engaged with the blades while the blades traverse a first portion of the blade path and to be disengaged from the blades while the blades traverse a second portion of the blade path, wherein the blades are configured to pivot freely from a first stop position to a second stop position opposite the first stop position in response to a force of the water;
    wherein as each blade traverses the first portion of the blade path, pivoting of the blade about its pitch axis is controlled by engagement with the cam formation; and as each blade traverses the second portion of the blade path, the blade is pivotable about its pitch axis within a range of movement delimited by a respective pair of stop formations, the stop formations of each pair being angularly spaced in mutual opposition about the pitch axis of the associated blade.

2. The assembly of claim 1, wherein the stop formations of each pair are movable with the associated blade about the turbine axis to change in orientation relative to the flow direction as the blade travels along the blade path.

3. The assembly of claim 1, wherein the stop formations are fixed in position in relation to the turbine axis and the associated pitch axis.

4. The assembly of claim 1, wherein a third portion directly follows the first portion so that control of the pivoting of each blade is transferred from the cam formation to the respective pair of stop formations as the blade disengages the cam formation and engages the respective pair of stop formations, and wherein the assembly is configured so that each blade engages each stop formation of the associated pair in succession within the third portion of the blade path.

5. The assembly of claim 1, wherein each blade pivots freely in the water flow in a fourth portion of the blade path that is within the second portion such that each blade trails in the water flow.

6. The assembly of claim 5, wherein each respective pair of stop formations is oriented such that, as the respective blade traverses the fourth portion, the respective range of movement allows the respective blade to be aligned with the flow direction.

7. The assembly of claim 1, wherein the cam formation is fixed relative to the turbine axis and a streamwise centerline of a supporting frame or a bluff body structure.

8. The assembly of claim 1, wherein a radial distance between the cam formation and the blade path varies around the turbine axis.

9. The assembly of claim 1, wherein the assembly is configured so that the blades are pivoted into engagement with the cam formation and/or the stop formations by the water flow flowing in the flow direction.

10. The assembly of claim 1, wherein each blade comprises; an engagement formation that is configured to engage the cam formation as the blade moves around the blade path and wherein the engagement formation is also configured to engage at least one of the stop formations associated with the blade.

11. The assembly of claim 10, wherein each engagement formation extends along an axis that is parallel to, and mutually spaced from, the respective pitch axis.

12. The assembly of claim 11, wherein each engagement formation is disposed at or close to a trailing edge of the respective blade.

13. The assembly of claim 12, wherein each engagement formation comprises a follower that is arranged to slide or roll along the cam formation and vary the pitch of the respective blade.

14. The assembly of claim 1, wherein the first portion extends through an area in which the blades are configured to generate maximum lift from the water flow flowing in the flow direction.

15. The assembly of claim 14, wherein the first portion is predominantly upstream of the turbine axis relative to the flow direction.

16. The assembly of claim 15, wherein the second portion is predominantly downstream of the turbine axis relative to the flow direction.

17. The assembly of claim 16, wherein the second portion extends through an area in which the blades move upstream with respect to the flow direction.

18. The assembly of claim 1, comprising an accelerator having a front face that is configured to generate an accelerated driver current from the water flow, wherein the array of blades is mounted beside the accelerator so that the accelerated driver current flows towards a portion of the blade path.

19. The assembly of claim 18, wherein the accelerator comprises a flow directing vane that extends laterally from the accelerator upstream of the turbine axis, the flow directing vane being configured to direct the accelerated driver current onto blades of the array in an upstream portion of the blade path with respect to the flow direction, and to shield blades of the array in a downstream portion of the blade path with respect to the flow direction.

20. The assembly of claim 19, wherein the assembly comprises allowing the blades to pivot freely in the water flow in a fourth portion of the blade path that is within the second portion such that the blades trail in the water flow.

\* \* \* \* \*